(12) United States Patent
Fan

(10) Patent No.: US 7,197,161 B2
(45) Date of Patent: Mar. 27, 2007

(54) EMBEDDING INFORMATION IN IMAGES USING TWO-LAYER CONJUGATE SCREENING

(75) Inventor: Zhigang Fan, Webster, NY (US)

(73) Assignee: Xerox Corporation, Rochester, NY (US)

( * ) Notice: Subject to any disclaimer, the term of this patent is extended or adjusted under 35 U.S.C. 154(b) by 817 days.

(21) Appl. No.: 10/600,139

(22) Filed: Jun. 20, 2003

(65) Prior Publication Data

US 2004/0258272 A1    Dec. 23, 2004

(51) Int. Cl.
*G06K 9/00* (2006.01)
(52) U.S. Cl. ............... 382/100; 382/274; 358/3.28
(58) Field of Classification Search ............ 382/100, 382/112, 113, 114, 116, 123, 135, 137, 138, 382/139, 140, 162, 168, 179, 193, 274, 232–243, 382/276, 305; 713/176; 283/72.91; 358/3.28
See application file for complete search history.

(56) References Cited

U.S. PATENT DOCUMENTS

| | | | |
|---|---|---|---|
| 5,790,703 A * | 8/1998 | Wang | 358/3.28 |
| 6,252,971 B1 * | 6/2001 | Wang | 382/100 |
| 6,731,409 B1 * | 5/2004 | Wang | 358/3.28 |
| 6,839,450 B1 * | 1/2005 | Yen et al. | 382/100 |
| 6,991,260 B1 * | 1/2006 | Fan et al. | 283/72 |
| 7,058,199 B1 * | 6/2006 | Au et al. | 382/100 |
| 7,086,666 B1 * | 8/2006 | Richardson | 283/91 |
| 7,089,420 B1 * | 8/2006 | Durst et al. | 713/176 |

* cited by examiner

*Primary Examiner*—Matthew C. Bella
*Assistant Examiner*—Seyed Azarian
(74) *Attorney, Agent, or Firm*—Oliff & Berridge, PLC

(57) ABSTRACT

A new information embedding technology is disclosed using conjugate screen concept. More specifically, two screens are applied in a halftoning process, one for the areas that corresponds to the symbol to be embedded (object), and one for the background. Both screens can be conceptually decomposed into a two-layer structure similar to supercells. The top layer determines the overall halftone texture, while the bottom layer, which is conjugate for background and object, carries embedded data. The information can be retrieved digitally or optically. In embedding, there is no restriction of the symbol sizes. The computation is relatively simple and can be implemented in real time. In retrieval, it is relatively robust to registration errors.

12 Claims, 5 Drawing Sheets

FIG. 1
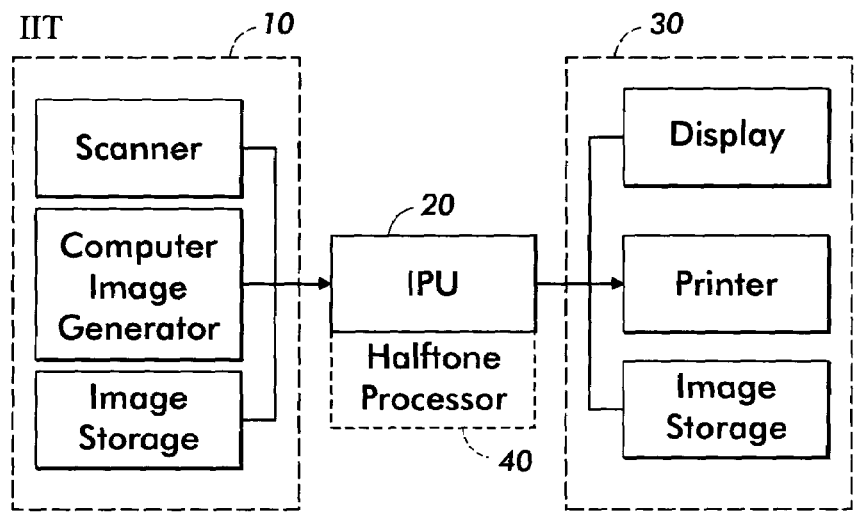
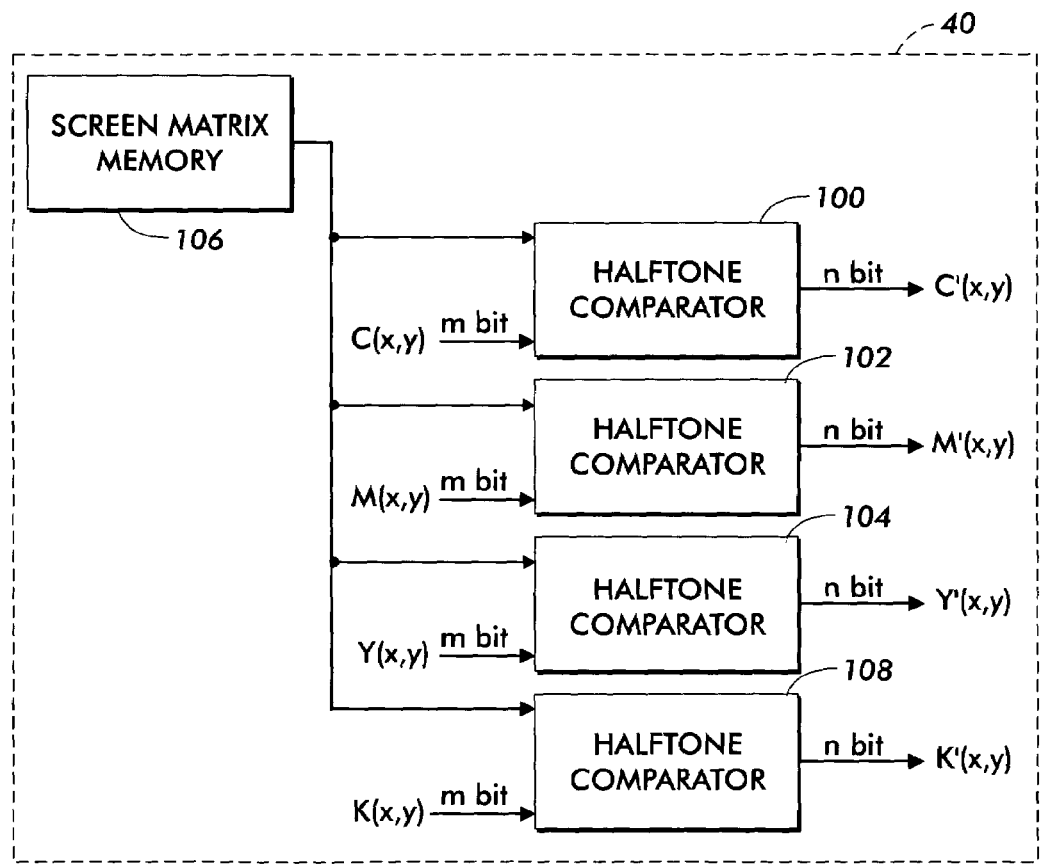
FIG. 2

FIG. 3

| | | |
|---|---|---|
| 2 | 6 | 3 |
| 8 | 9 | 7 |
| 1 | 5 | 4 |

50

| | | | | | |
|---|---|---|---|---|---|
| 6 | 4 | 7 | 5 | 6 | 6 |
| 6 | 6 | 8 | 5 | 6 | 6 |
| 6 | 6 | 3 | 7 | 8 | 6 |
| 6 | 6 | 7 | 4 | 6 | 6 |
| 6 | 6 | 8 | 5 | 6 | 6 |
| 5 | 6 | 3 | 5 | 6 | 6 |

| | | | | | |
|---|---|---|---|---|---|
| 2 | 6 | 3 | 2 | 6 | 3 |
| 8 | 9 | 7 | 8 | 9 | 7 |
| 1 | 5 | 4 | 1 | 5 | 4 |
| 2 | 6 | 3 | 2 | 6 | 3 |
| 8 | 9 | 7 | 8 | 9 | 7 |
| 1 | 5 | 4 | 1 | 5 | 4 |

|   |   |   |   |   |   |
|---|---|---|---|---|---|
| 1 | 0 | 1 | 1 | 0 | 1 |
| 0 | 0 | 1 | 0 | 0 | 0 |
| 1 | 1 | 0 | 1 | 1 | 1 |
| 1 | 0 | 1 | 1 | 0 | 1 |
| 0 | 0 | 1 | 0 | 0 | 0 |
| 1 | 1 | 0 | 1 | 1 | 1 |

56

58

| 3 | 4 |
|---|---|
| 1 | 2 |

| 2 | 1 |
|---|---|
| 4 | 3 |

| 20 | 29 | 24 | 33 | 21 | 30 |
|----|----|----|----|----|----|
| 2  | 11 | 6  | 15 | 3  | 12 |
| 26 | 35 | 27 | 36 | 25 | 34 |
| 8  | 17 | 9  | 18 | 7  | 16 |
| 19 | 28 | 23 | 32 | 22 | 31 |
| 1  | 10 | 5  | 14 | 4  | 13 |

62

| 11 | 2  | 15 | 6  | 12 | 3  |
|----|----|----|----|----|----|
| 29 | 20 | 33 | 24 | 30 | 21 |
| 17 | 8  | 18 | 9  | 16 | 7  |
| 35 | 26 | 36 | 27 | 34 | 25 |
| 10 | 1  | 14 | 5  | 13 | 4  |
| 28 | 19 | 32 | 23 | 31 | 22 |

FIG. 10
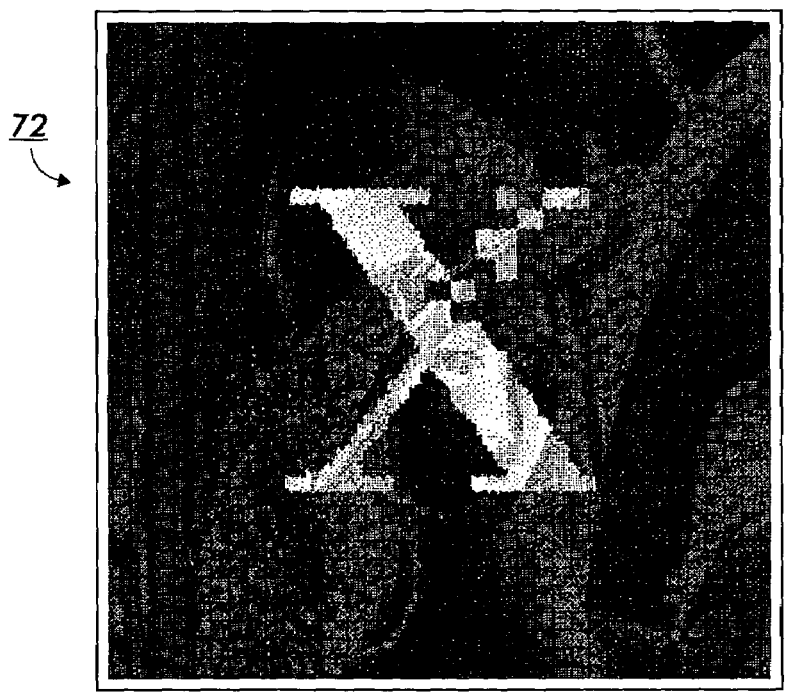
FIG. 11

EMBEDDING INFORMATION IN IMAGES USING TWO-LAYER CONJUGATE SCREENING

BACKGROUND

The introduction of the plain paper copier has resulted in a proliferation of paper copies of paper originals. A similar result is happening to electronic images, given the easy availability of digital scanners and a quick and widespread access to images throughout the Internet. It is now very difficult for the creator of an image to generate an electronic original, for which he can be assured that illegal copies will not be spread to third parties. The use of a digital watermark is a technology that aims to prevent that spread, by incorporating an identifying mark within the image that allows one to identify the source of the image in an electronic copy. It is important that the identifying mark not be disturbing or distracting to the original content of the image, while at the same time, allowing an easy identification of the source. The watermarks could be added either by the scanner or by the halftoning software.

Watermark identification may be accomplished by embedding a digital watermark in a digital or printed page that will identify the owner of rights to the image. In the past, these images have been produced and delivered in hard copy. In the future, these images will be distributed mainly in digital form. Therefore, image identification will have to work for both hard copy and digital image forms.

Watermarking can take two basic forms, visible or perceptible and invisible or imperceptible. Visible watermarks are marks such as copyright logos or symbols or logos that are imprinted into the digital or printed image to be distributed. The presence of the watermark is made clearly visible in the image in a way that makes it difficult to remove without damaging the image. The presence of the visible watermark does not harm the usefulness of the image, but it prevents the image from being used without permission. However, visible watermarks may interfere with the use of the image or with the image aesthetics. The visible watermark is also a potential target for fraud, in that it is possible for a fraudulent copier of the image to identify the location of the watermark and attempt to reproduce the image without the watermark.

Invisible watermarks are marks such as copyright symbols, logos, serial numbers, etc. that are embedded into digital or printed images in a way which is not easily discernible to the unaided eye. At a later time, the information embedded in these watermarks can be derived from the images to aid identification of the source of the image, including the owner and the individual to whom the image is sold. Such watermarks are useful for establishing ownership when ownership of an image is in dispute. They will be less likely to be useful as a deterrent to the theft of the image.

While either or both visible or invisible watermarks are desirable in an image, they represent different techniques for either preventing copying or detecting copying. It is anticipated that document producers may wish to use both kinds of protection.

The concept of conjugate screen has been used in stochastic screening for embedding information into the images. In comparing to the other data-hiding techniques such as digital watermarks, it has the advantage that it is robust to printing. In addition, the embedded information can be retrieved not only digitally, but also optically. However, it also has a few weaknesses. First, the information embedding process needs substantial computation and is difficult to be implemented in real time. Second, the size of the embedded symbol is constrained by the halftone matrix size. Third, careful registration is required in optical detection.

SUMMARY

A new information embedding technology is disclosed using conjugate screen concept. More specifically, two screens are applied in a halftoning process, one for the areas that corresponds to the symbol to be embedded (object), and one for the background. Both screens can be conceptually decomposed into a two-layer structure similar to supercells. The top layer determines the overall halftone texture, while the bottom layer, which is conjugate for background and object, carries embedded data. The information can be retrieved digitally or optically. In embedding, symbol sizes are no more restricted by the halftone matrix sizes. The computation is relatively simple and can be implemented in real time. In retrieval, it is relatively robust to registration errors.

BRIEF DESCRIPTION OF THE DRAWINGS

FIG. 1 represents a system in which the present invention may find particular use;

FIG. 2 is an illustration of a halftoning arrangement to produce a halftone image;

FIG. 3 is an illustration of a 3×3 halftone screen;

FIG. 4 is an illustration of a 6×6 input image;

FIG. 5 is an illustration of the threshold values after the halftone screen of FIG. 3 is repeated;

FIG. 6 is an illustration of the resulting halftone image of from FIGS. 4 and 5;

FIG. 7*a* is an illustration of a 2×2 bottom background screen;

FIG. 7*b* is an illustration of a 2×2 bottom object screen;

FIG. 8 is an illustration of a 6×6 background screen;

FIG. 9 is an illustration of a 6×6 object screen;

FIG. 10 shows an exemplar image which embeds a Xerox logo; and

FIG. 11 shows an image which simulates the detection result.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE DRAWINGS

For a general understanding reference is made to the drawings wherein like reference numerals have been used throughout to designate identical elements. Each location in an image may be called a "pixel." In an array defining an image in which each item of data or image signal provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining the image.

With reference now to FIG. 1 there is shown a general system representing an electronic representation of an original document obtained from an image input terminal 10 in a format related to the characteristics of the device and commonly with pixels defined at n bits per pixel. The electronic image signals will be directed through an image processing unit (IPU) 20 to be processed so that an image suitable for reproduction on image output terminal 30 is obtained. Image processing unit (IPU) 20 commonly includes a halftone processor 40 which converts m-bit digital image data signals to n-bit image data signals suitable for driving a particular printer or other device where m and n are integer values. Commonly, the images may be represented in a page description language format, describing the appearance of the page. In such a case, the IPU 20 may include a processing element for decomposition of the page, and color conversion elements for providing appropriate signals to drive a printer.

FIG. 2 shows the operational characteristics of halftone processor 40. In this example, there is illustrated a color processing system using four separations, $C(x,y)$, $M(x,y)$, $Y(x,y)$, and $K(x,y)$, obtained in each process independently for halftoning purposes to reduce an m-bit input to an n-bit output. It will be appreciated that the invention is also applicable to a single color separation or black and white reproduction situations as well. As depicted in FIG. 2 a source of screen matrix information, screen matrix memory 106 provides an input to each comparator 100, 102, 104, 106, and 108 for each color separation. The other input to each comparator is the m-bit color separation image data. The output of each comparator is n-bit output which can be directed to a printer or similar device for rendering. This illustration is highly simplified in that distinct screen matrices may be supplied to each comparator.

Consider generating halftone images from an input image by a screen threshold matrix with N×M elements. The matrix is first periodically repeated to cover the whole image. The value of each input pixel is then compared to the corresponding threshold value. The output halftone value for the image is set to be one if the input value is greater than the threshold. Otherwise the halftone value is zero.

By way of example only, using FIG. 3 as a 3×3 screen threshold matrix 50, and applying the threshold matrix to a 6×6 input image 52 shown in FIG. 4 results in the halftone screen shown in FIG. 6. More specifically, FIG. 5 shows the threshold values after the matrix of FIG. 3 is periodically repeated. In pixel (1,1) of FIG. 4, the pixel of the first row and first column, the input value is 6 and the corresponding threshold value in FIG. 5 is 2. Since the input value is greater than the threshold value, the output is 1. On the contrary, the input of pixel (1,2) in FIG. 4 is smaller than the threshold in FIG. 5 (4 vs. 6), and the output is 0. FIG. 6 shows the resulting halftone 56 after completing the above procedure for each cell.

In accordance with the present invention, information is embedded in halftones. Two screens are applied in the halftoning process, one for the areas that correspond to the symbol to be embedded (object), and one for the background. In the proposed method, both screens can be conceptually decomposed into a two-layer structure similar to supercells. Specifically, the top layers, which control the dot allocation among the small blocks, are the same for both background and object screens. In contrast, the bottom layers that control the dot allocation within each block are conjugate for the object and the background. In other words, they have opposite filling orders. The bottom layer matrices are typically small (2×2 or 3×3 blocks).

Both the top and the bottom layers can be specified by screen matrices. The top layer determines the overall halftone appearances. It can be any halftone screen, including stochastic, clustered and dispersed screens. The background and the object screens can be generated using the top and bottom screens. This can be illustrated by the following example wherein the 3×3 matrix shown in FIG. 3 is used as the top screen.

FIGS. 7*a* and 7*b* specifies 2×2 bottom screens for background 58 and object 60, respectively. The generated 6×6 background 62 and the object screens 64 are given in FIGS. 8 and 9 (all the screens only specify the filling order). It can be observed that the corresponding 2×2 blocks of FIGS. 7*a* and 7*b* contain the same numbers, but at different locations. For example, the top left blocks of both screens are composed of 2, 11, 20, 29, but 2 appears at the bottom left of the block in background and at top right in object. Consequently, given the same input, both screens will generate halftones with similar overall texture, but with a difference in detail, or with a relative shift.

Generally speaking, for an M×N top screen and L×L bottom screens, the entries of the background and object screens can be obtained as:

$$bk(i, j) = t(k, r) + (M \times N) \times [b_{bk}(m, n) - 1],$$

$$ob(i, j) = t(k, r) + (M \times N) \times [b_{ob}(m, n) - 1],$$

where
m, n=0, 1, . . . L−1
k=0, 1, M−1
r=0, 1, . . . N−1
i=L×k+m,
j=L×r+n, where $bk(i, j)$ and $ob(i, j)$ are the (i, j)-th entry of background and object screens, respectively, t is the top screen, and $b_{bk}$ and $b_{ob}$ are bottom screen for background and object screens, respectively. The embedded symbol can be retrieved by digitally or optically superimposing a halftone image that is created with either background and object screen with a uniform input, preferably at mid-tone. FIG. 10 shows an exemplar image, which embeds a Xerox logo. FIG. 11 simulates the detection result.

It is, therefore, apparent that there has been provided, in accordance with the present invention, a method and apparatus for providing digital watermarks. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. A process for generating an authenticable document, wherein an authentication image inserted therein is not readily visually perceptible, including:

generating a first halftone screen;

generating a second halftone screen, related and distinct from the first halftone screen, wherein the macro structure of the second halftone screen is identical to that of the first halftone screen and the micro structure of the second halftone screen is conjugate to that of the first halftone screen generating a first user image using the first halftone screen and the second halftone screen, wherein a region is generated using the first halftone screen and a remaining region is generated using the second halftone screen;

generating a second user image using the first halftone screen whereby upon placing the first and second user images in a superposed relationship to allow viewing of both user images together, a positive correlation occurs between the two user images within the regions in which the first halftone screen is used in the first user image, and a negative correlation occurs between the two user images within the regions in which the second halftone screen is used in the first user image, so that the authentication image becomes visible in contrast between the positive correlation of the corresponding regions and the negative correlation of the remaining regions enabling authentication of the authenticable document; and a negative correlation occurs between the two halftone screens in the first and second user images everywhere within the region in which the second halftone screen is a conjugate of the corresponding region of the first halftone screen, and where a positive correlation occurs where the two screens are identical, so that the authentication image becomes visible in contrast between the positive correlation of the corresponding regions and the negative correlation of the remaining regions enabling authentication of the authenticable document.

2. The process as described in claim 1, wherein the authenticable document is a color document comprising plural color separations, and the first and second patterns are used together in one of the plural color separations in the first user image, and the first pattern is used in one of the plurality of color separations in the second user image.

3. The process as described in claim 1, wherein the first and second images are digital images and wherein the step of placing the first and second images in a superposed relationship is accomplished by digital processing of the first and second images.

4. The process as described in claim 1, wherein both the first and second images are rendered on substrates and at least one of the first and second images is rendered on a substantially transparent substrate and wherein the step of placing the first and second images in a superposed relationship is accomplished by placing the transparent substrate over the other substrate in an aligned relationship.

5. The process of claim 1, wherein the steps of generating a user image comprise:
  applying a respective screen to an input image to produce a halftoned output image;
  rendering the halftoned output image in a human viewable form; and
  scanning the rendered image to produce a respective user image as a digitized representation of the rendered image.

6. A process for generating an authenticable document, wherein an authentication image inserted therein is not readily visually perceptible, including the steps of:
  generating a first halftone screen;
  generating a first image using the first halftone screen;
  generating a second halftone screen, related and distinct from the first halftone screen to form the authentication image wherein a region of the second halftone screen is substantially a conjugate of a corresponding region of the first halftone screen and the remaining region of the second halftone screen is identical to the remaining region of the first halftone screen;
  generating a second user image using the second halftone screen;
  superposing the first and second images to enable the detection of a negative correlation between the halftone screens in the first and second user images everywhere within the corresponding regions where the second halftone screen is a conjugate of the first halftone screen and positive correlation between the halftone screens in the remaining regions where the second halftone screen is identical to the first halftone screen, the authentication image placed therein becoming detectable in contrast between the negative correlation and the positive correlation to allow authentication of the authenticable document.

7. The process as described in claim 6, wherein the authenticable document is a color document comprising plural color separations, and the first and second patterns are used together in one of the plural color separations in the first user image, and the first pattern is used in one of the plurality of color separations in the second user image.

8. The process as described in claim 6, wherein the first and second images are digital images and wherein the step of placing the first and second images in a superposed relationship is accomplished by a logical combination of the first and second images.

9. A process for generating an authenticable document, wherein an authentication image inserted therein is not readily visually perceptible, including:
  means for generating a first halftone screen;
  means for generating a second halftone screen, related and distinct from the first halftone screen, wherein the macro structure of the second halftone screen is identical to that of the first halftone screen and the micro structure of the second halftone screen is conjugate to that of the first halftone screen
  means for generating a first user image using the first halftone screen and the second halftone screen, wherein a region is generated using the first halftone screen and a remaining region is generated using the second halftone screen;
  means for generating a second user image using the first halftone screen whereby upon placing the first and second user images in a superposed relationship to allow viewing of both user images together, a positive correlation occurs between the two user images within the regions in which the first halftone screen is used in the first user image, and a negative correlation occurs between the two user images within the regions in which the second halftone screen is used in the first user image, so that the authentication image becomes visible in contrast between the positive correlation of the corresponding regions and the negative correlation of the remaining regions enabling authentication of the authenticable document; and
  a negative correlation occurs between the two halftone screens in the first and second user images everywhere within the region in which the second halftone screen is a conjugate of the corresponding region of the first halftone screen, and where positive correlation occurs where the two screens are identical, so that the authentication image becomes visible in contrast between the negative correlation of the corresponding regions and the positive correlation of the remaining regions enabling authentication of the authenticable document.

10. The process as described in claim 9, wherein the authenticable document is a color document comprising plural color separations, and the first pattern is used in one of the plural color separations in the first user image, and the first and second patterns are used together in one of the plurality of color separations in the second user image.

11. The process as described in claim 9, wherein the first and second images are digital images and wherein the step of placing the first and second images in a superposed relationship is accomplished by digital processing of the first and second images.

12. The process as described in claim 9, wherein both the first and second images are rendered on substrates and at least one of the first and second images is rendered on a substantially transparent substrate and wherein the step of placing the first and second images in a superposed relationship is accomplished by placing the transparent substrate over the other substrate in an aligned relationship.

* * * * *